United States Patent [19]

McMillan

[11] 4,147,070
[45] Apr. 3, 1979

[54] AUTOMATIC BELT TIGHTENER

[75] Inventor: Stephen L. McMillan, Louisville, Ky.

[73] Assignee: General Electric Company, Louisville, Ky.

[21] Appl. No.: 833,774

[22] Filed: Sep. 15, 1977

[51] Int. Cl.² .......................... F16H 7/10; F16H 7/12
[52] U.S. Cl. .......................... 74/242.11 C; 74/242.9; 74/242.11 R
[58] Field of Search ......... 74/242.8, 242.9, 242.1 TA, 74/242.11 R, 242.11 C, 242.11 E, 242.16, 226; 34/139

[56] References Cited

U.S. PATENT DOCUMENTS

| | | | |
|---|---|---|---|
| 891,636 | 6/1908 | Sandera | 74/242.9 |
| 2,243,538 | 5/1941 | Salfisberg | 74/242.8 |
| 3,211,015 | 10/1965 | Bochan | 74/220 |
| 3,330,049 | 7/1967 | Heltan | 74/242.11 R |
| 3,864,986 | 2/1975 | Bochan | 74/242.11 C |
| 4,019,397 | 4/1977 | Bochan | 74/242.11 R |

*Primary Examiner*—Samuel Scott
*Assistant Examiner*—William R. Henderson
*Attorney, Agent, or Firm*—Bruce A. Yungman; Frederick P. Weidner

[57] ABSTRACT

An automatic belt tightener for use in a belt drive mechanism for transmitting torque between a driving rotatable member and a driven rotatable member through a flat drive belt. Included is a roller assembly pivotable about the driving member and including a first, second and third roller, the driving member and the three rollers each having outside diameter grooves formed respectively by a pair of flanges, reduced interior diameters, and having their longitudinal axes of rotation parallel and spaced a fixed distance apart during operation of the mechanism. The flanges of only the first and third roller being in contact with the driving member and the second roller being driven by the first and third rollers. A drive belt passes between and in contact with reduced interior diameter of the first and second rollers and between and in contact with the reduced diameters of the second and third rollers and partially around the third roller and exiting the mechanism. When torque is applied to the driving member the roller assembly will pivot about the driving member and the respective rollers will automatically exert forces against the belt effecting driving engagement therebetween. There is also provided a first set of spaced parallel rings each having an interior diameter in rolling contact with the grooves of the driving member and the second roller and a second set of spaced parallel rings each having an interior diameter in rolling contact with the grooves of the first and third rollers.

8 Claims, 4 Drawing Figures

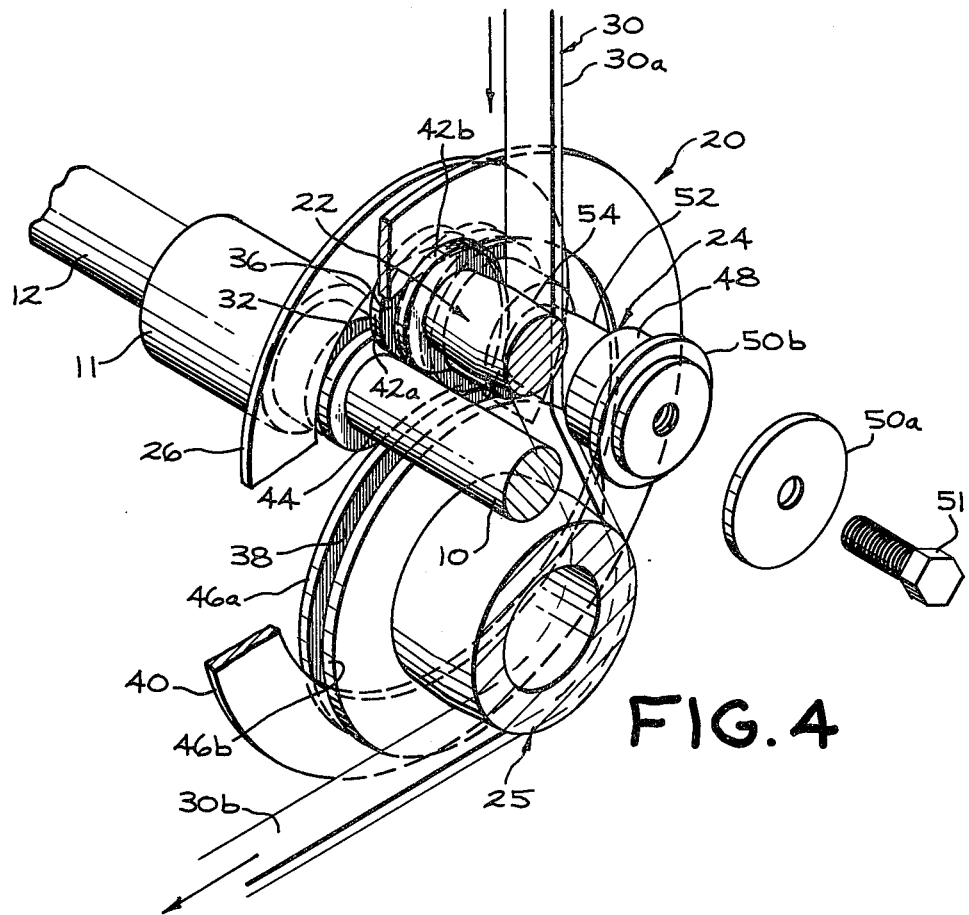
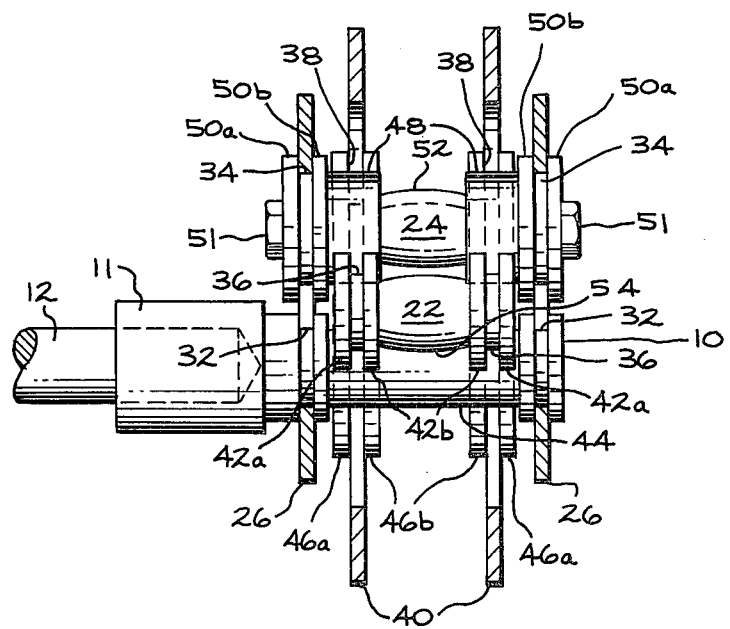

AUTOMATIC BELT TIGHTENER

BACKGROUND OF THE INVENTION

1. Field of the Invention

The present invention relates to an automatic belt tightener and more particularly to a belt drive mechanism for transmitting torque between a driving rotatable member and a driven rotatable member thereby making use of such an automatic belt tightener for insuring efficient transfer of torque between the driving member and the driven member and further, for automatically taking up any slack that may be present in such a belt drive arrangement.

2. Description of the Prior Art

The rotational velocity of an element being rotated, such as the drum of a domestic clothes dryer, is often times critical and is necessary to be kept within given small tolerances in order to maintain the proper tumbling of clothes in the drum. This is especially so since the outside diameter or surface of the dryer tumbling drum is commonly used as a large pulley. However, in converting from the use of a four-pole drive motor rotating at 1725 RPM's to a two-pole drive motor rotating at 3450 RPM's, in order to maintain this fixed rotational velocity it is necessary to halve the diameter of the motor drive pulley; that is, when the drive pulley of the four-pole motor was ⅝" diameter, it is necessary to convert to a 5/16" diameter when using a two-pole motor. A problem arises, that of poor driving engagement between the motor drive pulley and the drive belt due to reduced frictional surface. In fact, a two-pole motor having a 5/16" diameter drive pulley turning at 3450 RPM's is virtually unable to transmit full torque without external help and instead causes over-heating and subsequent destruction of the belt.

Prior art such as U.S. Pat. No. 2,243,538-Salfisberg shows a device for providing pressure between a belt and a driving pulley independent of tension in the belt and independent of any take-up device that is ordinarily used to regulate that tension. Salfisberg U.S. Pat. No. 2,243,538 shows a set of three pulleys, the pressure exerted against the belt being manually adjustable by varying air pressure in a pneumatic drive pulley. It is, however, desirable that such frictional engagement between the belt and the driving member be applied automatically by the device itself.

Furthermore, in production application, a tolerance is necessary in belt lengths; and means, preferably automatic, must be provided for taking up the slack that may result in a belt drive system due to this tolerance. Also, with use and age, the belt tends to lengthen and it is desirable that means should be provided for automatically taking up the slack that results.

The prior art has taught the use of idler roller tensioners which are usually spring loaded to effect this operation. One such application is shown in U.S. Pat. No. 3,211,015-Bochan, assigned to the same assignee as the present invention.

The prior art also teaches an automatic belt tightener mechanism in U.S. Pat. No. 3,864,986-Bochan, assigned to the same assignee as the present invention. That mechanism takes up the belt slack and increases the frictional drive engagement automatically and eliminates the need for idler roller tensioners. That mechanism, however, drives the belt about a small diameter motor drive pulley and has the belt pinched between the driver and the pulleys or rollers which can detrimentally affect the belt wear and life.

By the present invention, there is provided an automatic belt tightener that solves the above-mentioned problems and which is highly reliable, efficient and of low-cost.

SUMMARY OF THE INVENTION

In accordance with the present invention, there is provided in a belt drive mechanism for transmitting torque between a driving rotatable member and a driven rotatable member through a drive belt, an automatic belt tightener. Included is a freely-riding, roller assembly pivotable about the driving member and including first, second and third rollers, the driving member and three rollers each having outside diameter grooves formed respectively by a pair of flanges, reduced interior diameters, and having their longitudinal axes of rotation parallel and spaced a fixed distance apart during operation of the mechanism. The flanges of only the first and third rollers being in contact with the driving member and the second roller being driven by the first and third rollers. The drive belt passes between and in contact with the reduced interior diameters of the first and second rollers and between and in contact with the reduced interior diameters of the second and third rollers and partially around the third roller and existing the mechanism therefrom. There is also provided a first set of spaced parallel rings each having an interior diameter in rolling contact with the grooves of the driving member and the second roller. A second set of spaced parallel rings is also provided with each ring having an interior diameter in rolling contact with the grooves of the first and third rollers.

By this automatic belt tightener arrangement, as torque is applied to the driving member and if there is any slack in the belt, the roller assembly will pivot about the longitudinal rotational axis of the driving member in a direction the same as the direction of rotation of the driving member for allowing any slack in the belt to be taken up automatically. By the passing of the belt over the rollers in this arrangement the belt is not driven by a small diameter motor drive shaft nor is the belt pinched between the driver and the pulleys. There is also no need for idler roller tensioners and any belt slack is taken up automatically.

BRIEF DESCRIPTION OF THE DRAWINGS

FIG. 3 is a view, partly in section and partly broken away, taken along lines 3—3 of FIG. 2.

FIG. 4 is a perspective view of the automatic belt tightener partially disassembled shown in FIG. 1.

DESCRIPTION OF THE PREFERRED EMBODIMENT

Figure 1:
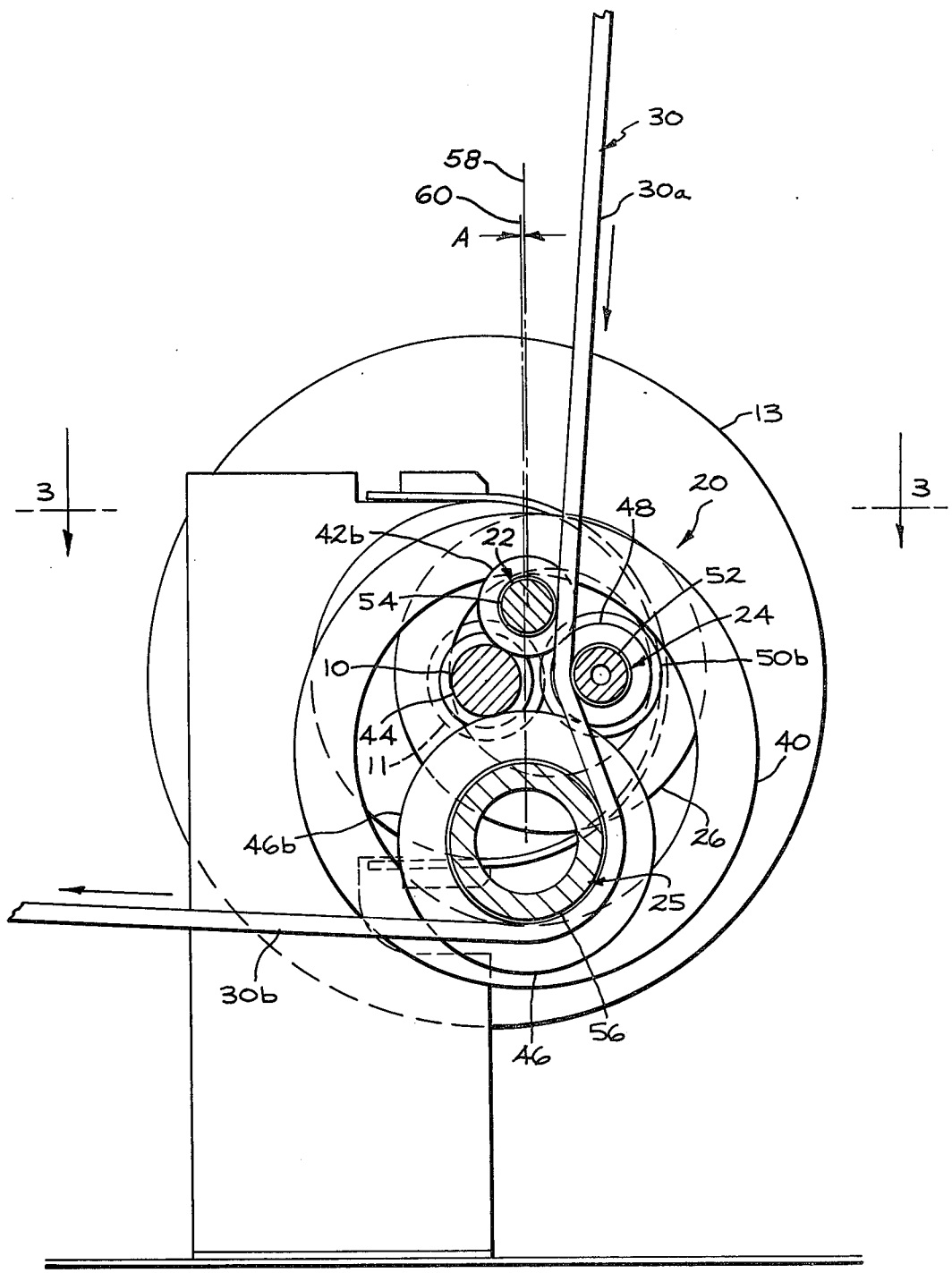
FIG. 1 is a view, partially broken away, of one embodiment of the automatic belt tightener of the present invention shown in the slack belt position before tightening.

Referring to the Figures, there is shown a belt drive mechanism for transmitting torque between a driving rotatable member 10 such as a quill or shaft operatively coupled through adaptor 11 with a drive shaft 12 of a motor and a rotatable member 15 driven by the belt 30 such as the rotating drum of a domestic clothes dryer.

In accordance with the present invention in one embodiment thereof an automatic belt tightener comprises a freely-riding roller assembly denoted generally as 20 that is an assembly independent of and free to pivot about driving member 10. Included are three rotatable rollers such as first roller 22, second roller 24 and third roller 25. The driving member 10 and three rollers 22, 24 and 25 have their longitudinal rotational axes parallel and spaced a fixed distance apart during operation of the mechanism. The shaft or driving member 10 and roller 24 are provided respectively with a pair of circumferential recesses or grooves 32 and 34, respectively, disposed in parallel at opposing ends of the rotational axes of the respective driving member and roller 24 for receiving a pair of retaining rings 26 in common with driving member 10 and roller 24.

The rollers 22 and 25 are also provided, respectively, with a pair of circumferential recesses or grooves 36 and 38, respectively, disposed in parallel at opposite ends of the rotational axes of the respective rollers 22 and 25 for receiving a pair of retaining rings 40 in common with the rollers 22 and 25. By this arrangement then the driving member 10 and roller 24 are retained within the interior diameters of rings 26 and in rolling contact therewith and rollers 22 and 25 are retained within the interior diameters of rings 40 and in rolling contact therewith. With this arrangement of grooves and rings the mechanism and particularly the rollers are kept in their proper place axially with respect to the driving member 10 and with respect to driving engagement with each other as will be explained later.

The grooves 36 of roller 22 are in the preferred embodiment provided by two sets of circular flanges 42a and 42b and the outside diameter of the flanges 42a and 42b are in rolling driven contact with the reduced interior diameter 44 of the driving member 10. The grooves 38 of roller 25 may also be provided by circular flanges 46a and 46b with the outside diameter of those flanges being in rolling driven contact with the reduced interior diameter 44 of driving member 10. The grooves 34 of roller 24 may be provided by two sets of circular flanges 50a and 50b. Flanges 50a are circular discs that are secured to the roller 24 by threaded bolts 51. In this manner the entire roller assembly 20 may be assembled easily. The roller 24 is not directly in contact and driven by the driving member 10 but rather it is driven by the outside diameter surfaces of flanges 46a and 46b of roller 25 and flanges 42a and 42b of roller 22 being in rolling contact with surface 48 of roller 24 which has a diameter less than the outside diameter of flanges 50a and 50b which form the groove 34 in that roller. The surface 48 has a diameter greater than the reduced interior diameter 52 of roller 24.

Figure 2:
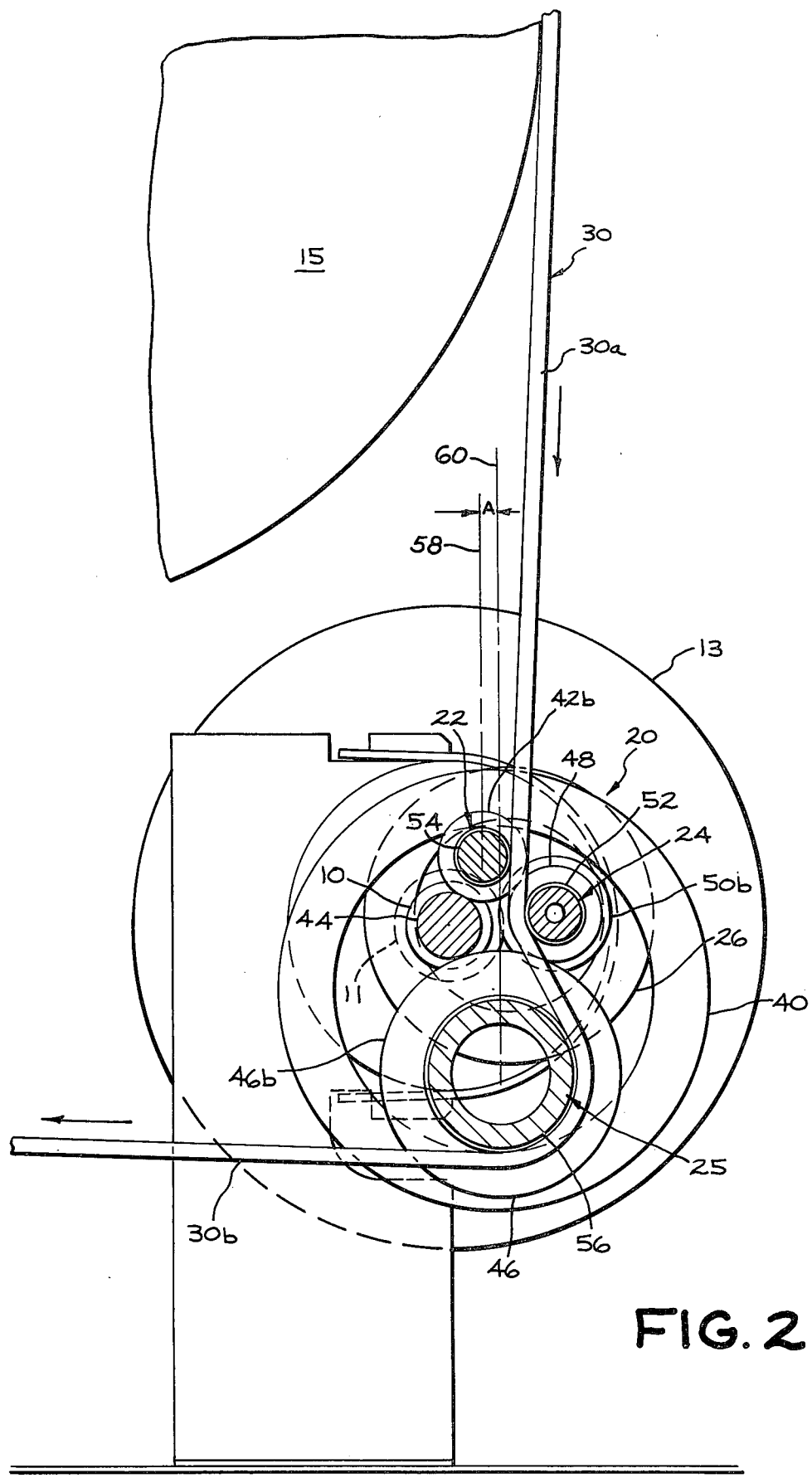
FIG. 2 is a view, partially broken away, of the embodiment of the automatic belt tightener of FIG. 1 shown with the belt in the tight or slack-taken-up position.

A belt, such as an endless flat drive belt 30 serves to transmit torque from the driven member 10 and a driven rotatable member, such as a clothes retaining drum 15 of a domestic dryer. The direction of travel of drive belt 30 has been denoted in the figures by arrows with section 30a being under greater tension than section 30b when the driving member 10 rotates in a counter-clockwise direction as shown in FIGS. 1 and 2. Tracing the path then of drive belt 30, it proceeds downwardly passing between and in contact with the reduced interior diameter 54 of roller 22 an the reduced interior diameter 52 of roller 24 and then from there it passes between rollers 24 and 25 and partially around the reduced interior diameter 56 of roller 25 and then exits the mechanism at the slack side 30b of the belt. As torque is applied to driving member 10, causing it to rotate in a counter clockwise direction, then, if there is any slack in the belt 30 the unbalance of forces will cause the mechanism to rotate counterclockwise about the driving member 10 and take up any slack in the belt. The rotation of the mechanism can be seen by comparing FIG. 1 with FIG. 2. In FIG. 1 the condition of the belt tightener in the slack belt position is shown and it will be noted that the vertical line 58 drawn through the center axis of roller 22 is slightly to the right of the vertical line 60 drawn through the center axis of roller 25 and in FIG. 2 if has passed through the vertical line 58 of roller 22 and is on the left side thereof. Also, the distance, designated "A," between the vertical center lines 58 and 60 drawn through the center axes of rollers 22 and 25 is less than the distance "A" shown in FIG. 2 where the belt 30 is in the tight position. It can be seen from FIGS. 1 and 2 that the belt 30 is not in driving engagement directly with the driving member 10 but rather is in contact with the three rollers 22, 24 and 25, and all of those rollers are driven either directly or indirectly by the driving member 10. In this type of arrangement then the belt does not need to pass around a rather small shaft diameter nor is there any wedging action that could cause excessive wear of the belt.

It can also be seen that with this drive belt mechanism the belt will be guided around the reduced interior diameters of the respective pulleys, which diameters may be barrel shaped as shown in FIGS. 3 and 4 to assist in centering the belt as is well known in the art.

It should be apparent to those skilled in the art that the embodiment described heretofore are considered to be the presently preferred form of the invention. In accordance with the Patent Statutes, changes may be made in the disclosed mechanism in the manner in which it is used without actually departing from the true spirit and scope of the invention.

What is claimed is:

1. In a belt drive mechanism for transmitting torque between a driving rotatable member and a driven rotatable member through a drive belt, an automatic belt tightener comprising:
(a) a freely-riding, roller assembly pivotable about the driving member and including first, second, and third rollers, each opposing end of the driving member and three rollers having outside diameter grooves formed respectively by a pair of flanges, reduced interior diameters, and having their longitudinal axes of rotation parallel and spaced a fixed distance apart during operation, the flanges of only the first and third roller being in contact with the driving member, and the second roller being driven by the first and third rollers,
(b) the drive belt passing between and in contact with the reduced interior diameters of the first and second rollers and between and in contact with the reduced interior diameters of the second and third rollers and partially around said third roller and exiting the mechanism therefrom, such that as torque is applied to the driving member the respective rollers will automatically exert forces against the belt effecting driving engagement therebetween,
(c) a first set of spaced parallel rings each having an interior diameter in rolling contact with the grooves of the driving member and the second roller, and (d) a second set of spaced parallel rings each having an interior diameter in rolling contact with the grooves of the first and third rollers.

2. The automatic belt tightener of claim 1 wherein, as torque is applied to the driving member, the roller assembly may pivot with respect to the longitudinal rotational axis of the driving member in a direction the same as the direction of rotation of the driving member for taking up automatically any belt slack.

3. In the belt drive mechanism of claim 1 wherein the drive belt is a flat endless belt.

4. In the belt drive mechanism of claim 1 wherein the outside flanges of one of the pair of flanges of the rollers and driving member are removable circular discs.

5. In a domestic clothes dryer having a belt drive mechanism for transmitting torque between a driving rotatable member and a rotatable clothes-retaining drum through an endless drive belt, an automatic belt tensioner comprising:

(a) a freely-riding, roller assembly pivotable about the driving member and including first, second, and third rollers, each opposing end of the driving member and three rollers having outside diameter grooves formed respectively by a pair of flanges, reduced interior diameters, and having their longitudinal axes of rotation parallel and spaced a fixed distance apart during operation, the flanges of only the first and third roller being in contact with the driving member, and the second roller being driven by the first and third rollers, (b) the endless drive belt passing between and in contact with the reduced interior diameters of the first and second rollers and between and in contact with the reduced interior diameters of the second and third rollers and partially around said third roller and exiting the mechanism therefrom and around the drum, such that as torque is applied to the driving member the roller assembly will pivot about the driving member and the respective rollers will automatically exert forces against the belt effecting driving engagement therebetween, (c) a first set of spaced parallel rings each having an interior diameter in rolling contact with the grooves of the driving member and the second roller, and (d) a second set of spaced parallel rings each having an interior diameter in rolling contact with the grooves of the first and third rollers.

6. In the domestic clothes dryer of claim 5 wherein, as torque is applied to the driving member, the roller assembly may pivot with respect to the longitudinal rotational axis of the driving member in a direction the same as the direction of rotation of the driving member for taking up automatically any belt slack.

7. In the domestic clothes dryer of claim 5 wherein the drive belt is a flat belt.

8. In the domestic clothes dryer of claim 5 wherein the outside flanges of one of the pair of flanges of the rollers and driving member are removable circular discs.

* * * * *